United States Patent [19]
Nagatomo et al.

[11] Patent Number: 5,461,085
[45] Date of Patent: Oct. 24, 1995

[54] SUPERABSORBENT POLYMER AND PROCESS FOR PRODUCING SAME

[75] Inventors: Akinori Nagatomo; Hiroaki Tamatani; Masanobu Ajioka; Akihiro Yamaguchi, all of Kanagawa, Japan

[73] Assignee: Mitsui Toatsu Chemicals, Incorporated, Tokyo, Japan

[21] Appl. No.: 357,163

[22] Filed: Dec. 13, 1994

[30] Foreign Application Priority Data

Dec. 17, 1993 [JP] Japan ................. 5-317802

[51] Int. Cl.$^6$ .................. C07D 243/00; C08J 9/36
[52] U.S. Cl. .................. 521/183; 521/184; 528/322; 528/328; 528/332; 528/363; 528/480; 528/492
[58] Field of Search .................. 521/183, 184; 528/322, 328, 333, 363, 480, 492

[56] References Cited

U.S. PATENT DOCUMENTS

| | | |
|---|---|---|
| 3,948,863 | 4/1976 | Akamatsu et al. |
| 4,307,220 | 12/1981 | Lucarelli et al. ............ 528/492 |
| 4,672,094 | 6/1987 | Nelb, II et al. ............ 528/492 |
| 4,996,292 | 2/1991 | Fox et al. |
| 5,057,597 | 10/1991 | Koskan . |
| 5,116,919 | 5/1992 | Buziukoi et al. ............ 528/492 |
| 5,219,986 | 6/1993 | Cassata . |

FOREIGN PATENT DOCUMENTS

| | | |
|---|---|---|
| WO92/14753 | 9/1992 | WIPO . |
| WO92/17525 | 10/1992 | WIPO . |
| WO93/20856 | 10/1993 | WIPO . |

OTHER PUBLICATIONS

Polymers for Advanced Technologies, M. De L. Machado et al, "Water–Soluble Polyamides as Potential Drug Carriers, IV: Amine–functionalized Copolyaspartamides", vol. 1, No. 5/6, Oct. 1990, pp. 275–285.

Primary Examiner—Morton Foelak
Attorney, Agent, or Firm—Burns, Doane, Swecker & Mathis

[57] ABSTRACT

A process for preparing a novel superabsorbent polymer which is readily hydrolyzed and conform to environment by reacting a polysuccinimide with a diamine in an aqueous solution or an organic solvent to partially crosslink the polysuccinimide, and subsequently or concurrently hydrolyzing the remaining imide ring with an alkali while controlling the pH; and the superabsorbent polymer thus obtained.

15 Claims, 1 Drawing Sheet

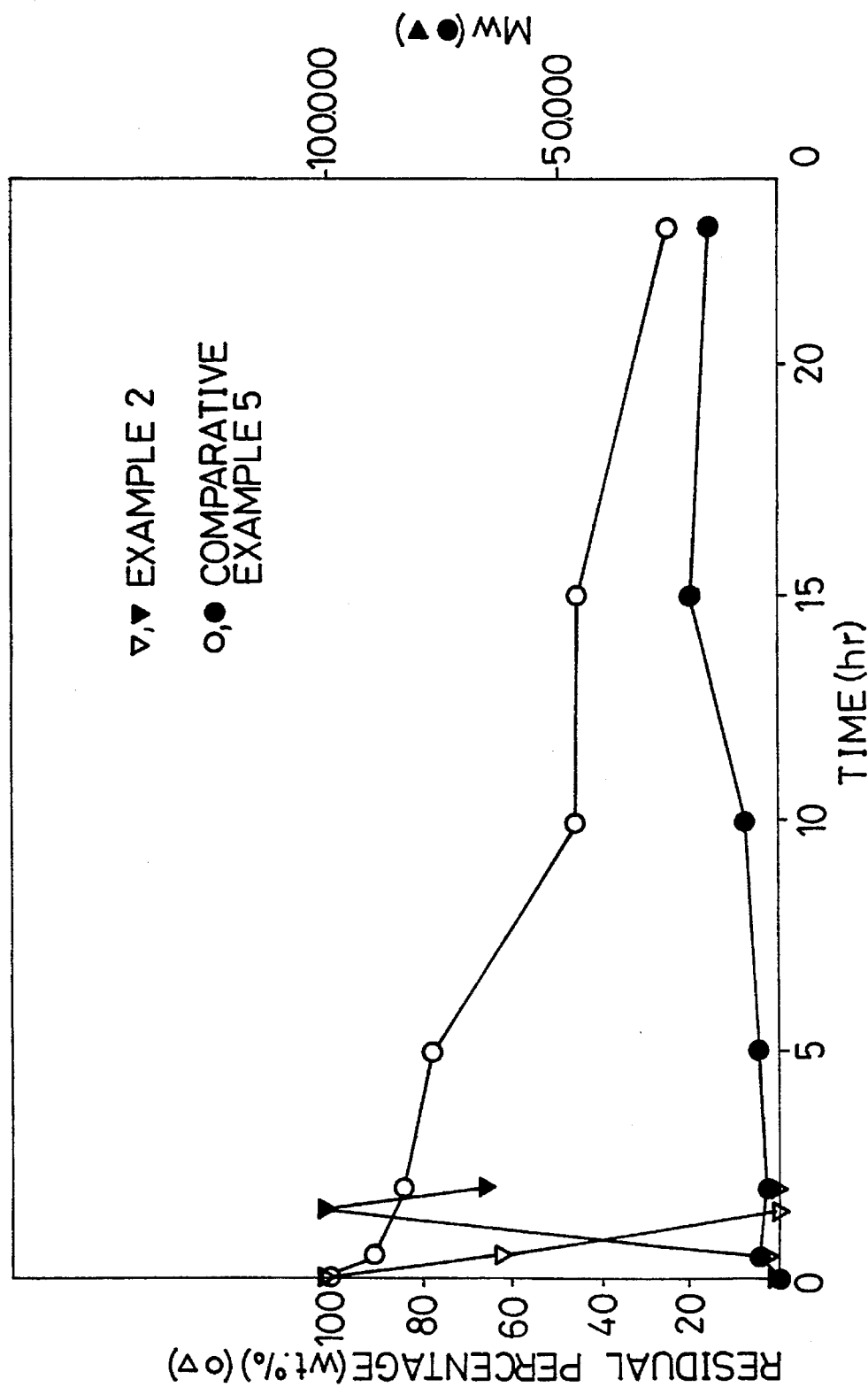

SUPERABSORBENT POLYMER AND PROCESS FOR PRODUCING SAME

BACKGROUND OF THE INVENTION i) Field of the Invention

The present invention relates to a superabsorbent polymer obtained by reacting a polysuccinimide (anhydropolyaspartic acid) with a diamine compound and subsequently hydrolyzing the reaction product or by reacting a polysuccinimide with a diamine compound in an aqueous solution and concurrently hydrolyzing the reaction product, and a process for producing the same.

ii) Description of the Prior Art

Polymer compounds referred to as superabsorbent polymers are known as polymers which absorb a large amount of water. These superabsorbent polymers are prepared from water-soluble polymers, but basically have crosslinking structures which render the polymers water-insoluble. Specific examples of the superabsorbent polymers include partial hydrolyzates of starch-acrylonitrile graft polymers, starch-acrylic acid graft polymers, crosslinked polymers formed by crosslinking acrylic acid with a copolymerizable crosslinking agent, hydrolyzates of methyl methacrylate-vinyl acetate copolymers, crosslinked polymers of polyvinyl alcohol base or polyethylene oxide base, and the like. Some of these have already been put to practical use [Masuda, F., "Superabsorbent polymers—characteristics and trends in development of application", Chem. Econ. Engineer. Rev., vol. 15, pp. 19–23 (1983)].

These superabsorbent polymers are widely used for fields including sanitary materials such as diapers and hygienic articles, agricultural materials such as water-holding materials for soil and sheets for seedlings, food-related materials such as food-freshness-keeping agents and dehydrating agents, public works materials or building materials such as dew inhibiting sheets on buildings and water sealing agents, and the like. Since these superabsorbent polymers are not hydrolyzed, they can exist in water or soil semipermanently.

This durability is a desirable property for some uses. However, it raises a problem in view of environmental preservation after disposal because the materials are not readily degraded to low molecules when used as throwaway items represented by sanitary materials such as diapers and hygienic articles.

On the other hand, there have been several reports or disclosures on the technique for preparing water-insoluble superabsorbent polymers by crosslinking polyamino acids which have excellent safety and degradability.

There have been a technique which comprises esterifying the carboxylic side chain of a monoaminodicarboxylic acid (acidic amino acid) such as polyaspartic acid or polyglutamic acid, and crosslinking the side chain with a diamine to form a water-insoluble superabsorbent polymer (Akamatsu et al., U.S. Pat. No. 3948863; Japanese Patent Publication No. 41309/1977). This technique, which employs as a starting material a polyamino acid with its carboxylic side chains esterified, differs from other prior art in hat the starting material is brought into contact with a multivalent amine to amidate a part of the ester groups in the side chains of the polyamino acid, and then a part or all of the unreacted ester groups are converted to carboxyl groups or salts thereof.

A water-insoluble poly(tyrosine-glutamic acid) was reported (Overell et al., Journal of Chemical Society, Part I, "Polymers of Some Basic and Acidic alpha-Amino-acids", pp. 232–236, 1955). However, no disclosure is made on the possibility of applying the formed polypeptide to a water-insoluble hydrogel and the technique of attaining a high water-absorbency.

A technique was reported, that comprises irradiating a poly-γ-glutamic acid with γ rays to crosslink the polymer so as to form a water-insoluble superabsorbent polymer [Kunioka et al., Kobunshi Ronbun-shu (Polymer Papers), vol. 50, No. 10, p. 755 (1993)]. From a scientific point of view, this technique is interesting in that the polyamino acid which is weak to heating can be reacted at a low temperature. From an industrial point of view, however, this technique is not realistic because the necessary Co-60 irradiation facility is a extremely large scale for shielding and needs a strict control of leaked γ rays after irradiation. From an economical point of view, the superabsorbent polymer is disadvantageous because the polyglutamic acid used as the starting material is expensive.

There have been a technique which comprises crosslinking an acidic amino acid polymer with lysine-diketopiperazine to form a hydrophilic, biodegradable polymer (Iwatsuki et al., Japanese Patent Laid-Open No. 279416/1993). This technique however involves a problem such that preparation of the lysine-diketopiperazine as the crosslinking agent is difficult.

A proteinoid (protein-like compound) is produced from a mixture of α-amino acids by heat condensation at temperatures above 150° C. [Fox and Harada, Science, vol. 128, p. 1214 (1958) and J. Am. Chem. Soc., vol. 82, pp. 3745–3751 (1959)]. In this synthesis, the presence of an excessive amount of a monoaminodicarboxylic acid (acidic amino acid) is necessary for an unknown reason. At a temperature of 210° C. or higher, however, the amino acids are thermally decomposed so that the advantage of the excessive amount of a monoaminodicarboxylic acid is lost [Fox and Windsor, International Journal of Quantum Chemistry; Quantum Biology, vol. 11, pp. 103–108 (1984)].

There have been a technique which forms a water-soluble polypeptide by means of heat condensation (Fox et al., U.S. Pat. No. 4996292). However, no disclosure is made on the possibility of applying the formed polypeptide to a water-insoluble hydrogels and the technique of attaining a high water-absorbency.

A technique was reported, that crosslinks specific amino acid residues in an anionic polypeptide by means of heat condensation. In other words, there have been a technique which comprises heating glutamic acid and lysine or aspartic acid or polyaspartic acid and lysine to form a water-insoluble, crosslinked polypeptide (Japanese Patent National Publication No. 506244/1994; Donachy and Sikes, U.S. Pat. Nos. 5,247,068 and 5,284,936).

However, the reaction temperature disclosed of the heat condensation is 190°–250° C., that is severely high for the amino acids or polyamino acid. Accordingly, the formed polymer is unavoidably deteriorated in quality or colored due to partial decomposition and side reactions. The water-absorbency of the formed polymer is also insufficient. To improve the water-absorbency of the crosslinked polyamino acid formed, there have been a process in which the polyamino acid is hydrolyzed with an alkali at 80°–95° C. at a pH of 11–12 for 1–2 hours. This indicates that the cross-linked polyamino acid formed is resistant to the alkali treatment under such conditions, remaining as a water-insoluble hydrogel, and hence suggests that its degradability is low.

SUMMARY OF THE INVENTION

The object of the present invention is to solve the above-described problems of the prior art of superabsorbent polymers, and that is to provide a high-grade superabsorbent polymer which possesses an excellent water-absorbency and degradability.

As a result of intensive investigation in order to solve the above-mentioned problems, the present inventors have found that a polymer which possesses an excellent water-absorbency and hydrolyzability can be obtained by partially crosslinking a polysuccinimide with a diamine compound and subsequently hydrolyzing the crosslinked product or by reacting a polysuccinimide with a diamine compound in aqueous solution and concurrently hydrolyzing the reaction product. On the basis of the finding, they have completed the present invention.

That is, the aspect of this invention is a process for producing a polymer possessing an excellent water-absorbency and hydrolyzability which comprises reacting a polysuccinimide, obtained by subjecting aspartic acid to dehydration condensation, with a diamine compound in an aqueous solution or organic solvent to partially crosslink the polysuccinimide and hydrolyzing the remaining imide portion with an alkali while controlling the pH, and the superabsorbent polymer so obtained which possesses an excellent water-absorbency and hydrolyzability.

The novel superabsorbent polymer according to the present invention has an excellent water-absorbency and hydrolyzability. Further, according to the process of the present invention, it is possible to produce easily a superabsorbent polymer having such excellent properties. Since the superabsorbent polymer according to the present invention has a practically high water-absorbency, it can be widely used for sanitary materials such as diapers and hygienic articles, agricultural materials such as water-holding materials for soil and sheets for seedlings, food-related materials such as food-freshness-keeping agents and dehydrating agents, and public works materials or building materials such as dew inhibiting sheets on buildings. In addition, because it is readily hydrolyzed with an alkali, it can be discarded, regenerated or reused with ease by an alkali treatment after it is applied to these uses. Moreover, because it has an excellent hydrolyzability, it is a mild material for environment and living organisms.

BRIEF DESCRIPTION OF THE DRAWINGS

FIG. 1 is a graph illustrating the alkali-hydrolyze-abilities of polymers obtained in Example 2 and Comparative Example 5.

DESCRIPTION OF THE PREFERRED EMBODIMENTS

No particular limitations are placed on the process for producing the polysuccinimide used in the present invention. The polysuccinimide is generally produced by heat condensation of aspartic acid in the presence of phosphoric acid at 170°–180° C. in a vacuum. In order to obtain a polysuccinimide with a higher molecular weight, it is advisable to treat the polysuccinimide obtained above with a condensation agent such as dicyclohexylcarbodiimide. The molecular weight of the polysuccinimide may be so determined that the crosslinked polymer is rendered water-insoluble, and hence is preferably 20,000 or more in terms of weight average molecular weight.

The diamine compound used in the present invention includes, for example, aliphatic diamines such as ethylenediamine and hexamethylenediamine, alicyclic diamines such as norbornenediamine, amino acids having an amino group in the side chain typified by lysine and ornithine and derivatives thereof, and compounds formed by bonding monoamino compounds with a disulfide linkage typified by cystine and cystamine and derivatives thereof. Among these, preferred are lysine, ornithine, cystine, cystamine and derivatives thereof because degradation products of polymer are highly safe. The derivatives may include diketopiperazines, which are cyclic dimers of lysine and ornithine and esters of lysine, ornithine and cystine.

The amount of the diamine used is so determined that the resultant polymer can substantially exhibit water-insolubility and high water-absorbency, and hence is preferably 0.1–40 mol %, more preferably 1–30 mol %, based on the polysuccinimide. When the amount of the diamine is decreased, the water-solubility of the resultant polymer increases, while when the amount is increased, the water-absorbency decreases. Therefore, it is possible to exhibit desired characteristics by properly determining the amount of the diamine depending on the purpose.

The reaction of the polysuccinimide with the diamine is effected in an organic solvent or in an aqueous solution.
A method for reacting a polysuccinimide with a diamine in an organic solvent To react a polysuccinimide with a diamine in an organic solvent, the polysuccinimide is dissolved in an organic aprotic polar solvent such as dimethylformamide (DMF), dimethylacetamide (DMAc), N-methylpyrrolidone (NMP), dimethylimidazolidinone (DMI), dimethylsulfoxide (DMSO) and sulforan, and the diamine or a solution of the diamine in the organic solvent is added thereto dropwise. No particular limitations are imposed on the amount of the organic solvent used to dissolve the polysuccinimide. Generally, however, the organic solvent is used in an amount which may make the polymer concentration 1–30 wt. %.

The temperature in the reaction of the polysuccinimide with the diamine is not particularly limited, but generally room temperature is adopted.

One of the important features of the process according to the present invention is to select reaction conditions (reaction temperature, reaction time, reaction concentration, amount of diamine used, etc.) under which the reaction is terminated before or immediately before the reactant transforms into a jelly-like gel that is substantially difficult to be stirred. By terminating the reaction before or immediately before the reaction mass is gelled in this way, the subsequent isolation operation can be significantly made easy, and the formation of a polymer having an excellent water-absorbency can be realized. In contrast to the process according to the present invention, when the reaction mass is gelled, the hydrolysis proceeds insufficiently and, as a result, it becomes difficult to obtain a polymer showing a properly high water-absorbency.

To isolate the crosslinked polymer formed in the reaction, it is possible to use common isolation procedures known in the art, including, for example, recrystallization, reprecipitation, filtration, concentration, etc.

After isolation of the crosslinked polymer formed, the imide ring of the crosslinked polymer isolated is subjected to hydrolysis.

In the hydrolysis, no particular limitations are imposed on the reaction conditions (reaction system, pH, temperature, polymer-concentration, kind of alkali, and concentration of alkali, etc.), so long as it is substantially realized that the reaction system can be stirred, the hydrolysis of the imide ring is effected in a sufficient efficiency, the hydrolysis of the amide linkage in the main chain is caused to a small extent, and the pH can be controlled.

The reaction system in the hydrolysis of the crosslinked polymer is generally preferably a suspension of the crosslinked polymer in an aqueous solution.

The pH during the hydrolysis of the crosslinked polymer is generally preferably 8.0–11.5, more preferably 9.0–11.0. The lower the pH is (than the lower limit of the preferable range), the lower the efficiency of the hydrolysis of the imide ring is. On the other hand, the higher the pH is (than the upper limit of the preferable range), the more considerably the unfavorable hydrolysis of the amide in the main chain occurs.

The reaction generally proceeds faster with a larger amount of water. However, the concentration of polymer during the hydrolysis of the crosslinked polymer is preferably 0.5–10 wt. % in view of productivity.

Specific examples of the alkali used in the hydrolysis of the crosslinked polymer may include alkali metal hydroxides such as sodium hydroxide and potassium hydroxide, and organic bases such as triethylamine, N-methylmorpholine, triethanolamine and diisopropylethylamine.

The alkali employed in the hydrolysis of the crosslinked polymer is usually used as its aqueous solution. Its concentration is not particularly limited so long as it is substantially such a concentration that the hydrolysis of the imide ring is effected in a sufficient efficiency, the hydrolysis of the amide in the main chain is caused to a small extent, and the pH can be controlled. However, it is preferably 0.01–5N, more preferably 0.1–2N. The lower the concentration is (than the lower limit of the preferable range), the lower the efficiency of the hydrolysis of the imide ring is. On the other hand, the higher the concentration is (than the upper limit of the preferable range), the more considerably the unfavorable hydrolysis of the amide in the main chain occurs.

A method for reacting a polysuccinimide with a diamine in an aqueous solution

A preferred embodiment of the reaction system in this method is a system in which the reaction is carried out by suspending a polysuccinimide in water. The amount of water used in the suspension reaction system is not particularly limited so long as the reaction system can be substantially stirred. In general, however, it is preferably 6–20 times that of the polysuccinimide in terms of weight ratio. The lower the amount is (than the lower limit of the preferable range), the more difficult the stirring of the reaction system is. On the other hand, the higher the amount is (than the upper limit of the preferable range), the higher the reaction rate of the hydrolysis tends to be.

In a preferred embodiment of the process for reacting a polysuccinimide with a diamine, the diamine or an aqueous solution of the diamine is added dropwise to an aqueous suspension of the polysuccinimide. When the diamine is in the form of a salt thereof, it is preferable to add it after neutralization.

Also in the process of reacting a polysuccinimide with a diamine in an aqueous solution, no particular limitations are imposed on the reaction conditions (reaction system, pH, temperature, polymer concentration, kind of alkali and concentration of alkali), so long as the reaction system can be substantially stirred, as the hydrolysis of the imide ring is effected in a sufficient efficiency, as the hydrolysis of the amide in the main chain is caused to a small extent, and as the pH can be controlled.

While controlling the pH by the addition of an alkali, a crosslinking reaction is caused to proceed between the imide ring of the polysuccinimide and the diamine and concurrently the remaining imide ring is hydrolyzed. The pH of the reaction system is generally preferably 8.0–11.5, more preferably 9.0–11.0. The lower the pH is (than the lower limit of the preferable range), the lower the efficiency of the hydrolysis of the imide ring is. On the other hand, the higher the pH is (than the upper limit of the preferable range), the more considerably the unfavorable hydrolysis of the amide in the main chain occurs.

When a polysuccinimide is reacted with a diamine in an aqueous solution, the polymer absorbs water and swells with the progress of the reaction. Therefore, it is preferable to add water where the maintenance of uniform stirring is necessary. No particular limitations are placed on the amount of the water to be added to the reaction system so long as the stirring of the system can be maintained substantially. The amount of the water is properly selected depending on the kind and amount of the diamine added, but is preferably so adjusted that the concentration of the polymer may eventually become 0.1–2 wt. %.

The temperature in the reaction of the polysuccinimide with the diamine is not particularly limited, but the reaction is usually carried out at room temperature.

Specific examples of the alkali used in the reaction may include alkali metal hydroxides such as sodium hydroxide and potassium hydroxide, and organic bases such as triethylamine, N-methylmorpholine, triethanolamine and diisopropylethylamine.

The alkali employed in the reaction is usually used as its aqueous solution. Its concentration is not particularly limited so long as it is substantially such a concentration that the hydrolysis of the imide ring is effected in a sufficient efficiency, the hydrolysis of the amide in the main chain is caused to a small extent, and the pH can be controlled. However, it is preferably 0.01–5N, more preferably 0.1–2N. The lower the concentration is (than the lower limit of the preferable range), the lower the efficiency of the hydrolysis of the imide ring is. On the other hand, the higher the concentration is (than the upper limit of the preferable range), the more considerably the unfavorable hydrolysis of the amide in the main chain occurs.

To isolate the crosslinked polymer formed in the reaction, it is possible to use common isolation procedures known in the art, including, for example, recrystallization, reprecipitation, filtration, concentration, etc.

The superabsorbent polymer thus obtained is a colorless or pale yellow powder in appearance. When it absorbs water, it becomes a transparent or colorless swollen gel.

Characterization of a superabsorbent polymer by evaluating alkali resistance

A superabsorbent polymer made of a water-insoluble crosslinked polypeptide can be characterized by the behavior of changing from a gel to a water-soluble polymer by an alkali treatment. The term "water-soluble" used in the present application signifies the state described below: A dispersion with a pH of 12 is prepared by mixing 4 wt. % of a water-insoluble superabsorbent polymer (dried) with sodium hydroxide and distilled water. The dispersion is treated at 95° C. for 2 hours and then filtered through a filter paper which retains particles with a diameter of 5 μm or above. When the residue on the filter has a dry weight not more than 10% that of the starting superabsorbent polymer, the polymer is defined as "water-soluble".

As a technique to improve the water-absorbency of a water-insoluble crosslinked polypeptide, it is known in the art to hydrolyze the polypeptide with an alkali at 80°–95° C. at a pH of 11–12 for 1–2 hours (Japanese Patent National Publication No. 506244/1994; Donachy and Sikes, U.S. Pat. Nos. 5,247,068 and 5,284,936). This indicates that the crosslinked polyamino acid formed by this technique is resistant to the alkali treatment under such conditions, remaining as a water-insoluble hydrogel, and hence suggests. that its degradability is low.

In contrast to the crosslinked polyamino acid formed by this technique, the superabsorbent polymer of the present invention readily becomes water-soluble by the alkali treatment under such conditions.

The difference of the behaviors of changing from a gel to a water-soluble polymer by such an alkali treatment is supposed to reflect the molecular-level characteristics of the superabsorbent polymers, such as primary, secondary or higher-order structure, crosslinking condition (cross-linking density, uniformity of crosslinking, length of the crosslinking parts, etc.), hydration characteristics, charge condition (charge density, balance of charge, uniformity of charge, etc.), secondary bond (van der Waals bond, hydrogen bond, hydrophobic bond, etc.) and the like. It can also be a measure for hydrolytic characteristics. Thus, the difference between the behaviors of superabsorbent polymers changing from a gel to water-soluble polymers by an alkali treatment can be acknowledged as an overall difference between the molecular structures of the superabsorbent polymers.

Methodology of characterization of a superabsorbent polymer by evaluating water-absorbency The superabsorbent polymer made of a water-insoluble crosslinked polypeptide can be characterized by the behavior of water-absorbency.

The greatest characteristic of a superabsorbent polymer is literally its water-absorbency. Although the evaluation of this characteristic is very important, it is not standardized by persons skilled in the art under the existing circumstances. It is not specified yet in the Japanese Industrial Standard. Therefore, since the results of a sample vary significantly depending on the methods of evaluation, it is necessary to select the best method of evaluation in accordance with the purpose. The water-absorbency of a superabsorbent polymer is substantially classified as three powers, that is suction power, retention power and gelation power. The suction power indexes practical performance of use for paper towels, etc. The retention power indexes that for diapers, sanitary napkins, hygienic tampons, water-holding materials for soil, etc. The gelation power indexes that for sludge coagulating agents, etc. (Superabsorbent Polymer, written by Masuda and published by Kyoritsu Publishing Co. in 1987, pp. 51–56).

Considering that the principal use of superabsorbent polymers is for diapers, sanitary napkins, hygienic tampons and water-holding materials for soil, the retention power constitutes a particularly important index. From this background, the tea bag method is prevailing as the method for evaluating the water-absorbency in Japan where the research and development of superabsorbent polymers have been brisk because the method can evaluate the water-absorbency with a very high correlation with the practical performances as sanitary napkins, hygienic tampons and water-holding materials for soil, and moreover is simple and easy and has a high reproducibility (Superabsorbent Polymer, written by Masuda and published by Kyoritsu Publishing Co. in 1987, pp. 51–56; Japanese Patent Laid-Open No. 170835/1993; Japanese Patent Laid-Open No. 301904/1993).

As methods for evaluating the retention power other than the tea bag method may be mentioned the filtration method, the centrifugal dehydration method, the sheet method and the blue dextran method (Superabsorbent Polymer, written by Masuda and published by Kyoritsu Publishing Co. in 1987, pp. 51–56). In the case of considering the correlation with the practical performances as diapers, sanitary napkins, hygienic tampons and water-holding materials for soil, the water-absorbency evaluated by the filtration or centrifugal dehydration method is sometimes pretty higher than the actual performances, while that evaluated by the blue dextran or sheet method is sometimes pretty lower than the actual performances depending on the kind of the superabsorbent polymer being evaluated and the conditions of testing. Therefore, when the performances of different kinds of superabsorbent polymers are compared relatively by using these evaluation methods, it is feared that the results do not reflect the practical performances faithfully.

For instance, evaluation methods other than the tea bag method are occasionally used as in U.S. Pat. No. 5,247,068. In the centrifugal dehydration method, the water-absorbed superabsorbent polymers are centrifuged at 1300×g for 15 minutes to evaluate the water-absorbency of the superabsorbent polymers.

In the present application, however, the water-absorbency of superabsorbent polymers is evaluated by the use of the tea bag method which gives water-absorbencies highly correlated with practical performances as well as is simple and easy and exhibits a high reproducibility. The tea bag method employed in the present application is in accordance with the methods described in Japanese Patent Laid-Open Nos. 170835/1993 and 301904/1993.

Characterization of a superabsorbent polymer by evaluating water-absorbency

The superabsorbent polymer according to the present invention has an excellent water-absorbency. It has a retention power of 50 times or more for distilled water and 25 times or more for physiological saline solution (0.9 wt. % aqueous solution of NaCl) when evaluated by the tea bag method. Since the superabsorbent polymer according to the present invention shows a high water-absorbency, it is widely used as sanitary materials such as diapers and hygienic articles, agricultural materials such as water-holding materials for soil and sheets for seedlings, food-related materials such as food-freshness-keeping agents and dehydrating agents, and public works materials or building materials such as dew inhibiting sheets on buildings. Further, since it is readily hydrolyzed with an alkali, it can be discarded or regenerated or reused with ease after it is applied to these uses.

The present invention is illustrated in more detail by the following examples. However, these examples are not to be construed to limit the scope of the invention.

GPC: The weight average molecular weight (Mw) of a polysuccinimide was measured by gel permeation chromatography (GPC) using polystyrene as the standard. The Mw of a polyaspartic acid or the water-soluble polymer after hydrolysis was measured by GPC using polyethylene oxide as the standard. The amount of water absorbed was determined in the following manner.

Tea bag method: About 0.1 g of a dry superabsorbent polymer was inclosed in a tea bag (80 mm×100 mm) made of a nonwoven fabric, and the bag was dipped in an excessive amount of distilled water or physiological saline solution to allow the polymer to swell for a certain time. Then, the tea bag was pulled up, and was weighed after draining water for one minute. The same procedure was applied to the tea bag alone, and the weight of the resultant bag was measured as the blank. The measurements were carried out periodically. When the value obtained by subtracting the weight of the blank and dry superabsorbent polymer from the weight of the bag containing the polymer absorbed procedure becomes constant. The value was divided by the weight of the superabsorbent polymer to give the absorption of water (g/g polymer).

Centrifugal separation: About 0.1 g of a superabsorbent polymer was put into a preweighed centrifugal precipitation tube, and immersing the polymer to an excessive amount of distilled water or physiological saline solution for one hour to allow for absorption and swelling. The tube was centrifuged for 15 minutes at 1300×g. After removing the supernatant by means of a pipette, the weight of the tube containing the polymer was measured to determine the absorption of water (g/g polymer).

EXAMPLE 1

(Reaction of a polysuccinimide with a diamine compound in an organic solvent):

1.5 g of a DMF solution containing 0.54 g of hexamethylenediamine [15 mol % based on the polysuccinimide (100%)] were added dropwise at room temperature to a solution of 3.0 g of a polysuccinimide with an Mw of 83,000 in 18 g of DMF. The reaction solution was not gelled yet after the lapse of 2 minutes from the completion of the dropwise addition. Ethanol was added to the solution to produce a precipitate, which was separated by filtration and dried to obtain 2.5 g of a crosslinked polymer.

1.6 g of the crosslinked polymer thus obtained were suspended in 300 g of water, to which an aqueous 2N NaOH solution was added dropwise while controlling the pH at 9–11 to hydrolyze the remaining imide ring. The reaction suspension so obtained was discharged into ethanol. The solid precipitated out was separated by filtration and dried to obtain 1.4 g of a superabsorbent polymer.

EXAMPLE 2

(Reaction of a polysuccinimide with a diamine in an organic solvent):

1.8 g of lysine methyl ester dihydrochloride (15 mol % based on the polysuccinimide) were suspended in 20 g of DMF, and neutralized with 1.6 g of triethylamine. Into this solution, 25 g of a DMF solution containing 5.0 g of a poly-succinimide with an Mw of 94,000 was poured. The mixture was stirred for an hour at room temperature. 1.6 g of triethylamine were added dropwise to the resulting mixture to react it for 47 hours at room temperature. The reaction solution was filtered before the solution was gelled, and the filtrate was discharged into ethanol to produce a precipitate, which was separated and dried to obtain 5.1 g of a crosslinked polymer.

2.6 g of the crosslinked polymer thus obtained was suspended in 500 g of water, to which an aqueous 2N NaOH solution was added dropwise while controlling the pH at 9–11 to hydrolyze the remaining imide ring. The reaction suspension so obtained was discharged into ethanol. The precipitate was separated by filtration and dried to obtain 2.4 g of a superabsorbent polymer.

EXAMPLE 3

(Reaction of a polysuccinimide with a diamine in an organic solvent):

A desired superabsorbent polymer was obtained by the same procedure as in Example 2, except that the amount of lysine methyl ester dihydrochloride was changed to 2.4 g (20 mol % based on the polysuccinimide).

EXAMPLE 4

(Reaction of a polysuccinimide with a diamine in an organic solvent):

A desired superabsorbent polymer was obtained by the same procedure as in Example 2, except that a polysuccinimide with an Mw of 188,000 was used.

EXAMPLE 5

(Reaction of a polysuccinimide with a diamine in an organic solvent):

A desired superabsorbent polymer was obtained by the same procedure as in Example 2, except that a polysuccinimide with an Mw of 136,000 was used and the amount of lysine methyl ester dihydrochloride was changed to 3.6 g (30 mol % based on the polysuccinimide).

EXAMPLE 6

(Reaction of a polysuccinimide with a diamine in an aqueous solution):

3.0 g of a polysuccinimide with an Mw of 69,000 were suspended in 30 g of water, and a solution of 0.54 g of hexamethylenediamine (15 mol % based on the polysuccinimide) in 2.0 g of water was added slowly to the suspension drop-wise at room temperature. Subsequently, an aqueous 2N NaOH solution was added dropwise to the reaction suspension while controlling the pH at 9–11 to hydrolyze the remaining imide ring. In the course of the reaction, 300 g of water were added to the suspension. The reaction was carried out at 24° C. for 20 hours. The resultant reaction suspension was left to stand and the supernatant was removed. The remaining portion was discharged into 1.5 liter of isopropyl alcohol (IPA), and the precipitate was separated by filtration and dried to obtain 2.4 g of a superabsorbent polymer.

The elemental analysis of the superabsorbent polymer thus obtained is shown below.

|   | Calculated | Found |
|---|---|---|
| C | 40.79 | 40.81 |
| H | 4.20 | 4.35 |
| N | 12.57 | 12.78 |

EXAMPLE 7

(Reaction of a polysuccinimide with a diamine in an aqueous solution):

A desired superabsorbent polymer was obtained by the same procedure as in Example 6 except that a polysuccinimide with an Mw of 168,000 was used.

EXAMPLE 8

(Reaction of a polysuccinimide with a diamine in an aqueous solution):

A desired superabsorbent polymer was obtained by the same procedure as in Example 6 except that the amount of hexamethylenediamine was changed to 0.27 g (7.5 mol % based on the polysuccinimide).

EXAMPLE 9

(Reaction of a polysuccinimide with a diamine in an aqueous solution):

A superabsorbent polymer was obtained by the same procedure as in Example 6 except that a polysuccinimide with an Mw of 108,000 was used and ethylenediamine was used in place of hexamethylenediamine.

The elementary analysis of the superabsorbent polymer thus obtained is shown below.

|   | Calculated | Found |
|---|---|---|
| C | 38.71 | 38.57 |
| H | 3.72 | 3.82 |
| N | 13.76 | 13.67 |

EXAMPLE 10

(Reaction of a polysuccinimide with a diamine in an aqueous solution):

3.0 g of a polysuccinimide with an Mw of 10,8000 were suspended in 30 g of water. On the other hand, 1.0 g of cystamine dihydrochloride (15 mol % based on the polysuccinimide) was dissolved in 6.0 g of water and neutralized with 4.7 g of an aqueous 8% NaOH solution to prepare a solution. The solution was added slowly to the suspension dropwise at room temperature. Subsequently, an aqueous 2N NaOH solution was added dropwise to the reaction suspension while controlling the pH at 9–11 to hydrolyze the remaining imide ring. In the course of the addition, 300 g of water were added to the suspension. The reaction was carried out at 24° C. for 25 hours. The resulting reaction suspension was allowed to stand and the supernatant was removed. The remaining portion was discharged into 1.5 liter of IPA. The precipitate was separated by filtration and dried to obtain 4.5 g of a superabsorbent polymer.

The elementary analysis of the superabsorbent polymer thus obtained is shown below.

|   | Calculated | Found |
|---|---|---|
| C | 37.02 | 36.92 |
| H | 3.63 | 3.78 |
| N | 14.01 | 14.00 |

Comparative Example 1

10 g of a polysuccinimide with an Mw of 108,000 were dissolved in 60 g of DMF. Into the solution, 8.8 g of a DMF solution containing 1.8 g of hexamethylenediamine (15 mol % based on the polysuccinimide) were added dropwise at room temperature. After completion of the reaction, the reaction solution was gelled. On leaving the gel to stand overnight, a part of DMF oozed out from the gel. Hence, the gel was separated, washed with IPA, and dried to obtain 13 g of a crosslinked polymer.

5.5 g of the crosslinked polymer were suspended in 130 g of water, to which an aqueous 2N NaOH solution was added dropwise while controlling the pH at 9–11 to hydrolyze the imide ring. The reaction was carried out at 24° C. for 50 hours. The reaction suspension thus obtained was allowed to stand and the supernatant was removed. The remaining portion was discharged into 0.6 liter of IPA. The precipitate was separated by filtration and dried to obtain 3.5 g of a superabsorbent polymer.

The elemental analysis of the superabsorbent polymer thus obtained is shown below.

|   | Calculated | Found |
|---|---|---|
| C | 40.79 | 40.49 |
| H | 4.20 | 4.51 |
| N | 12.57 | 12.15 |

Comparative Example 2

A superabsorbent polymer was obtained by the same procedure as in Comparative Example 1 except that a polysuccinimide with an Mw of 168,000 was used and ethylenediamine was used in place of hexamethylenediamine.

The elemental analysis of the superabsorbent polymer thus obtained is shown below.

|   | Calculated | Found |
|---|---|---|
| C | 38.71 | 38.48 |
| H | 3.72 | 3.91 |
| N | 13.77 | 13.54 |

Comparative Example 3

1.8 g of lysine methyl ester dihydrochloride (15 mol % based on the polysuccinimide) were suspended in 20 g of DMF and neutralized with 1.6 g of triethylamine to prepare a solution. Into the solution, 25 g of a DMF solution containing 5.0 g of a polysuccinimide with an Mw of 108,000 was poured. The reaction solution was stirred for an hour at room temperature. Then, 1.6 g of triethylamine were added thereto dropwise to react it for 50 hours at room temperature. As a result, the reaction solution was gelled. The gel was taken out, washed with IPA, and dried to obtain 6.8 g of a crosslinked polymer.

2.6 g of the crosslinked polymer thus obtained were suspended in 40 g of water, to which an aqueous 2N NaOH solution was added dropwise while controlling the pH at 9–11 to hydrolyze the remaining imide ring. The reaction was carried out at 23° C. for 16 hours. The reaction suspension thus obtained was allowed to stand and the supernatant was removed. The remaining portion was discharged into 0.5 liter of IPA, and the solid was separated by filtration and dried to obtain 2.4 g of a superabsorbent polymer.

The elemental analysis of the superabsorbent polymer so obtained is shown below.

|   | Calculated | Found |
|---|---|---|
| C | 38.45 | 38.12 |
| H | 3.64 | 4.01 |
| N | 11.80 | 11.66 |

Comparative Example 4

2.9 g of a polysuccinimide with an Mw of 5,000 were suspended in 26 g of water, to which an aqueous 2N NaOH solution was added dropwise while controlling the pH at 9–11 to hydrolyze the polysuccinimide. After neutralizing the suspension, 2.0 g of aspartic acid and 1.4 g of lysine hydrochloride were added thereto to react it at 220° C. for 18 hours. 500 g of water were added to the reaction mixture to allow the solid to properly swell. The swollen suspension was filtered, washed and dried to obtain 1.9 g of a crosslinked polymer.

0.90 g of the crosslinked polymer so obtained was suspended in 90 g of water, to which an aqueous 2N NaOH solution was added dropwise to hydrolyze the polymer at a pH of 9–11. The resultant reaction suspension was filtered and the solid separated was dried to obtain 0.87 g of a brown superabsorbent polymer.

Comparative Example 5

4.1 g of polysodium aspartate with an Mw of 51,000 were suspended in 50 g of water and neutralized with HCl. 0.92 g of lysine hydrochloride was added to the suspension to effect the reaction mixture at 220° C. for 18 hours. 500 g of water was added to the reaction suspension to allow the solid to properly swell. The swollen suspension was filtered, washed and dried to obtain 3.5 g of a crosslinked polymer.

2.0 g of the crosslinked polymer thus obtained were suspended in 45 g of water, and the suspension was fed in an aqueous NaOH solution with a pH of 12 to hydrolyze the polymer at 95° C. for 2 hours. The resultant reaction suspension was filtered and the solid separated was dried to obtain 1.9 g of a brown superabsorbent polymer.

The absorption of water (g/g polymer) measured by the tea bag method and the centrifugal separation are shown in Table-1 with respect to the superabsorbent polymers obtained in Examples 1–10 and Comparative Examples 1–5.

TABLE 1

|  | Tea bag method | | Centrifugal separation | |
| --- | --- | --- | --- | --- |
|  | Distilled water | Saline solution* | Distilled water | Saline solution* |
| Example |  |  |  |  |
| 1 | 61.3 | 22.6 | — | — |
| 2 | 161 | 50.3 | 499 | 78.6 |
| 3 | 152 | 44.0 | 530 | 82.3 |
| 4 | 159 | 46.1 | 983 | 95.6 |
| 5 | 127 | 33.2 | 207 | 54.4 |
| 6 | 60.8 | 24.0 | — | — |
| 7 | 35.3 | 20.9 | — | — |
| 8 | 41.5 | 24.1 | — | — |
| 9 | 29.7 | 18.5 | — | — |
| 10 | 43.8 | 21.6 | — | — |
| Comp.Ex. |  |  |  |  |
| 1 | 22.3 | 10.4 | — | — |
| 2 | 10.3 | 7.6 | — | — |
| 3 | 34.7 | 20.3 | — | — |
| 4 | 34.3 | 20.8 | 82.2 | 34.7 |
| 5 | 23.9 | 14.6 | 53.9 | 30.6 |

*Saline Solution : Physiological saline solution (0.9 wt. % aqueous solution of NaCl)

EXAMPLE 11

1.0 g of the superabsorbent polymer obtained in Example 2 was suspended in 30 g of an aqueous NaOH solution with a pH of 12 and hydrolyzed at 95° C. for 2 hours. As a result, the polymer was rendered water-soluble.

EXAMPLE 12

1.0 g of the superabsorbent polymer obtained in Example 6 was suspended in 50 g of an aqueous 1N NaOH solution and hydrolyzed at 60° C. The polymer was completely rendered water-soluble after one hour of the reaction. Thereafter, the Mw was decreased with the lapse of time. The results are shown in Table-2.

TABLE 2

| Time (hr) | Mw |
| --- | --- |
| 0 | Immeasurable (water-insoluble) |
| 1 | 20,000 |
| 2 | 10,000 |
| 5 | 5,200 |
| 8 | 1,600 |

Comparative Example 6

1.0 g of the superabsorbent polymer obtained in Comparative Example 4 was suspended in 30 g of an aqueous NaOH solution with a pH of 12 and hydrolyzed at 95° C. for 2 hours. However, the polymer still remained as a gel.

FIG. 1 is a graph illustrating the alkali-hydrolyzabilities of polymers obtained in Example 2 and Comparative Example 5. The change of hydrolyzabilities on standing by the treatment (pH of 12, at 95° C.) is appeared as the residual percentage of dry residue of the polymer through a filter paper (particle diameter: 5 μm), and as the weight average of the molecular weight of the polymer in the filtrate.

What is claimed is:

1. A process for producing a superabsorbent polymer which comprises reacting a polysuccinimide with a diamine compound and subsequently hydrolyzing the reaction product in an aqueous solution while controlling the pH.

2. The process of claim 1 wherein the pH of the hydrolysis is in the range of from 8.0 to 11.5.

3. The process of claim 1 wherein the reaction of the polysuccinimide with the diamine compound is terminated prior to the gelation of the reaction solution.

4. The process of claim 1 wherein the diamine compound is selected from the group consisting of lysine, ornithine, cystine, cystamine, and derivatives thereof.

5. The process of claim 1 wherein the weight average molecular weight of the polysuccinimide is 20,000 or more.

6. The process of claim 1 wherein the amount of the diamine compound to be added is in the range of from 1 to 30 mol %.

7. A process for producing a superabsorbent polymer which comprises reacting a polysuccinimide with a diamine compound in an aqueous solution while controlling the pH and concurrently hydrolyzing the reaction product.

8. The process of claim 7 wherein the pH of the hydrolysis is in the range of from 8.0 to 11.5.

9. The process of claim 7 wherein the diamine compound is selected from the group consisting of lysine, ornithine, cystine, cystamine, and derivatives thereof.

10. The process of claim 7 wherein the weight average molecular weight of the polysuccinimide is 20,000 or more.

11. The process of claim 7 wherein the amount of the diamine compound to be added is in the range of from 1 to 30 mol %.

12. A superabsorbent polymer produced in accordance with the process of claim 1.

13. The superabsorbent polymer of claim 12 which absorbs distilled water in an amount 50 times or more that of the polymer according to the tea bag method.

14. A superabsorbent polymer produced in accordance with the process of claim 7.

15. The superabsorbent polymer of claim 14 which absorbs distilled water in an amount 50 times or more that of the polymer according to the tea bag method.

* * * * *